June 21, 1927.
J. J. RUTLEDGE
1,633,386
ENGINE STOPPING DEVICE
Filed Dec. 1, 1921
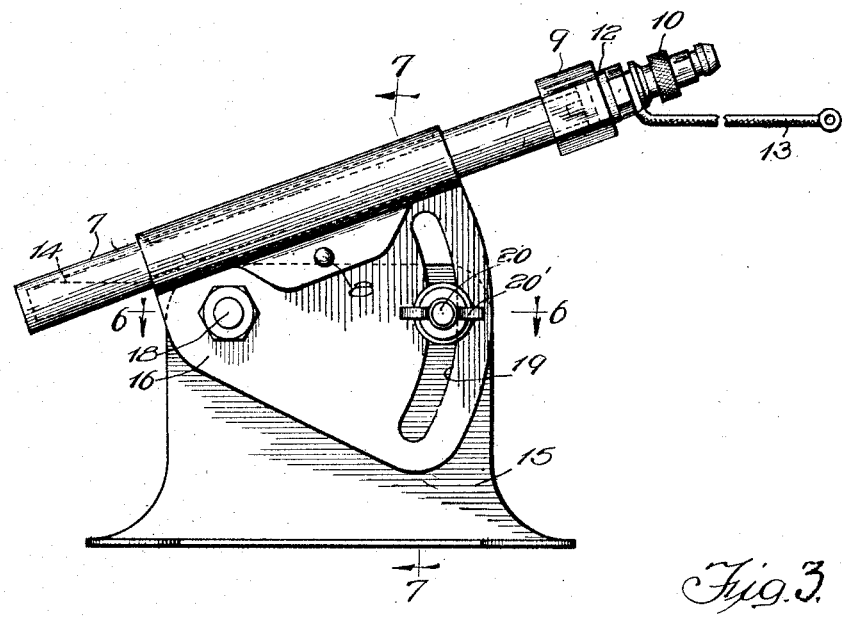
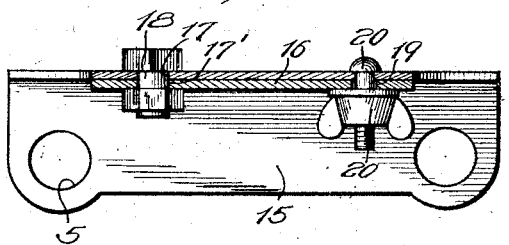
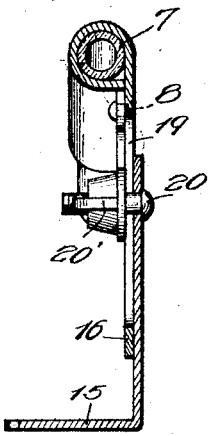
Witnesses:
W. F. Kilroy
Harry R. C. White
Inventor:
John J. Rutledge
By Nice & Nice Attys.

Patented June 21, 1927.

1,633,386

UNITED STATES PATENT OFFICE.

JOHN J. RUTLEDGE, OF JOLIET, ILLINOIS, ASSIGNOR OF ONE-HALF TO JOHN H. HARRISON, OF JOLIET, ILLINOIS.

ENGINE-STOPPING DEVICE.

Application filed December 1, 1921. Serial No. 519,239.

My invention relates to improvements in engine stops, and more particularly to automatic means for grounding the magneto of the motor vehicle upon which the device is mounted to stop the drive when the motor vehicle tilts a certain amount through a vertical angle. It is commonly known that motor vehicles, and particularly some types of tractors, which are worm driven with the shaft hung low, are liable to wind or rear upwardly about the rotational axis of the rear wheels when any obstruction sufficient to stop the forward propelling movement of the rear wheel is encountered. When a plow or other implement is attached to a tractor and the plowshare encounters a stump, stone, root or other obstruction, the forward movement of the vehicle is arrested, and as the engine and driving gear continue their operation, they cause the body of the tractor to wind or rear about the axis of the rear wheels. Unless the driver or operator is extremely agile, the tractor is liable to overturn and injure him before he can stop the engine or dismount from his seat. To avoid such consequences, my present improvement provides for the automatic stopping of the engine by controlling the same, for example, by grounding or short-circuiting the magneto or otherwise exerting control when the tractor tilts through a predetermined vertical angle.

The invention has among its other objects the production of a device of the kind described which will be simple, convenient, compact, durable, reliable, efficient and satisfactory for use wherever found applicable. Many other objects and advantages of the construction herein shown and described will be obvious to those skilled in the art from the disclosures herein given.

To this end my invention consists in the novel construction, arrangement and combination of parts herein shown and described, and more particularly pointed out in the claim.

In the drawings, wherein like reference characters indicate like or corresponding parts, Fig. 1 is a side elevation of my improved device.

Fig. 2 is a sectional view taken substantially on line 6—6 of Fig. 1; and

Fig. 3 is a sectional view taken substantially on line 7—7 of Fig. 1.

My invention is preferably applied to what is well known as the Ford type of tractor to which an agricultural implement, such as a plow, trailer, cultivator or the like (not shown), may be attached.

In plowing, for example, it frequently happens that the plowshare encounters a rigid obstruction, such as a stump, rock or the like, bringing the structure to a sudden stand-still, and since under the circumstances the rear wheels of the structure cannot turn, the entire machine starts to revolve about the axis of the rear wheels, the front wheels leaving the ground, and the entire structure rearing through a vertical angle, as indicated by the arc in Fig. 1. If the rearing continues, the structure will overturn and may injure the driver unless he stops the engine or succeeds in dismounting in time.

In order to stop the engine automatically when the structure has been lifted or tilted through a predetermined vertical angle, there is arranged a device as indicated at 2, and which preferably is mounted directly on some rigid part of the structure. The upper edge of the device 2 is bent over upon itself to form an upwardly and rearwardly inclined loop 6, adapted to receive a metal tube 7. A bolt or rivet 8, or other suitable fastening means, may be secured at the loop 6 to firmly clamp it about the tube 7.

It will be noted that there is no insulation between the metal tube 7 and the supporting bracket 2, nor between the supporting bracket 2 and the frame of the tractor, these parts being directly connected.

The upper end of the metal tube 7 is preferably screw threaded so as to receive a cap 9, through which is positioned an electrode or terminal 10, as shown. The electrode terminal 10 projects into the open upper end of the tube 7 and is insulated therefrom by a washer 11 and is insulated from the cap 9 by a washer 12. A conducting wire 13 is connected to the electrode 10 and leads to the magneto or other source of electrical energy which in turn is operatively connected to the motor or engine in any suitable manner.

A small quantity of mercury 14, or other mass of equivalent fluent conducting material is placed into the inclined tube 7 and gravitates toward the lower end thereof, as shown in Fig. 1. When the structure is horizontal, the mercury remains at the lower end of the tube and the magneto will continue to control the operation of the engine, but when the tractor is tilted through a sufficiently great vertical angle, the mercury will flow to the upper end of the tube, bridging the terminal 10 with the body of the motor vehicle through the tube and bracket and thus grounding or short-circuiting the magneto to stop the engine. While I have described the device as grounding a magneto obviously it may close a circuit controlling suitable apparatus, for example a solenoid and control the carburetor or fuel supply, thereby stopping the engine.

As will be noted the tube is mounted so that it may be adjusted through a suitable range of vertical angles or inclinations. The bracket 2 there shown comprises two parts 15 and 16, the part 15 being rigidly secured directly to the frame of the tractor and having an aperture 17 therethrough to align with an aperture 17′ of the cooperating bracket part 16, so as to receive a pivot bolt 18 therethrough. One of the bracket members, as for instance the member 16, is provided with an arcuate slot 19 having its center at 17′ and a bolt 20 is arranged on the bracket portion 15 so as to project through the slot 19. A wing nut 20′ is engageable with the bolt 20 to adjustably hold said bracket parts in position It will be noted from the above that the tube is mounted so as to be inclined upwardly and rearwardly of the tractor and is held rigidly in such inclination, and when the tractor tilts through a predetermined vertical angle, the mercury in the tube will short-circuit or ground the magneto or control other apparatus to stop the engine so as to permit the tractor to drop to its normal horizontal position.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

Circuit interrupting apparatus comprising a metallic tube adapted to hold a quantity of mercury, a substantially L-shaped bracket having one of its legs vertically disposed and having bolt holes in the other of its legs, a second bracket pivoted to said vertical leg and provided with an arcuate slot, a bolt carried by the first-mentioned bracket and projecting through the arcuate slot, a wing nut for said bolt whereby said second bracket may be secured in a plurality of adjusted positions relative to said first bracket, said second bracket having one of its marginal portions folded tightly around said metallic tube and riveted to another portion of the second bracket, and an electrode projecting into one end of the metallic tube and insulated therefrom.

In testimony whereof, I have hereunto signed my name.

JOHN J. RUTLEDGE.